United States Patent [19]

Hubert

[11] Patent Number: 5,048,061
[45] Date of Patent: Sep. 10, 1991

[54] METHOD FOR TRANSMITTING INFORMATION OVER A BIDIRECTIONAL LINK, AND APPARATUS FOR PERFORMING THE METHOD

[75] Inventor: Maurice Hubert, Versailles, France
[73] Assignee: Bull S.A., France
[21] Appl. No.: 400,136
[22] Filed: Aug. 29, 1989

[30] Foreign Application Priority Data

Aug. 31, 1988 [FR] France ............................ 88 11389

[51] Int. Cl.⁵ ............................................ H04L 7/04
[52] U.S. Cl. .................................... 375/111; 370/105.5
[58] Field of Search .......................... 375/4, 29–36, 375/106–109, 111; 370/24–29, 85.1, 105.5; 340/825.2, 825.21

[56] References Cited

U.S. PATENT DOCUMENTS

| | | | |
|---|---|---|---|
| 4,375,103 | 2/1983 | Arneth et al. | 375/109 |
| 4,475,191 | 10/1984 | James et al. | 375/106 |
| 4,637,016 | 1/1987 | Ciancibello | 370/23 |
| 4,644,525 | 2/1987 | Ellis et al. | 370/24 |
| 4,670,874 | 6/1987 | Sato et al. | 370/29 |
| 4,757,521 | 7/1988 | Korsky et al. | 375/109 |
| 4,847,867 | 7/1989 | Nasu et al. | 375/106 |

Primary Examiner—Stephen Chin
Attorney, Agent, or Firm—Kerkam, Stowell, Kondracki & Clarke

[57] ABSTRACT

A method of transmitting information in the form of electrical signals over a bidirectional link including a central station (S. C.) and a peripheral station (S. P.) connected to the central station via a bidirectional transmission bus (10), where the central station (S. C.) is provided with a clock (14) furnishing a synchronizing signal to the peripheral station (S. P.) is proposed, the method being characterized in that the synchronization is effected in the biphase mode upon transmission from the central station (S. C.), and in the monophase mode upon transmission from the peripheral station (S. P.). The invention is applicable to data transmission over a bidirectional link between various subsystems of a data processing system. The invention also relates to an apparatus for performing the above method.

37 Claims, 2 Drawing Sheets

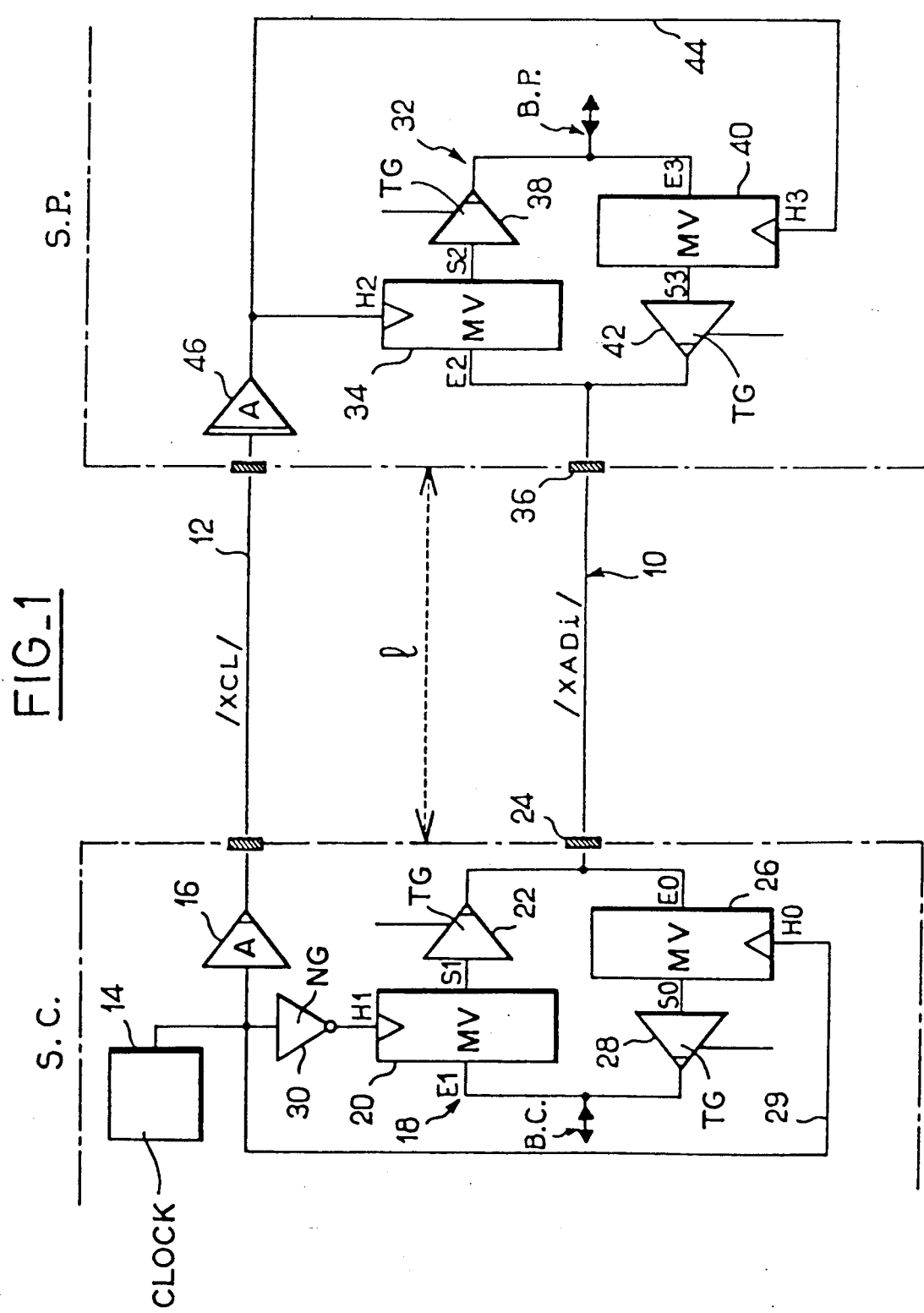

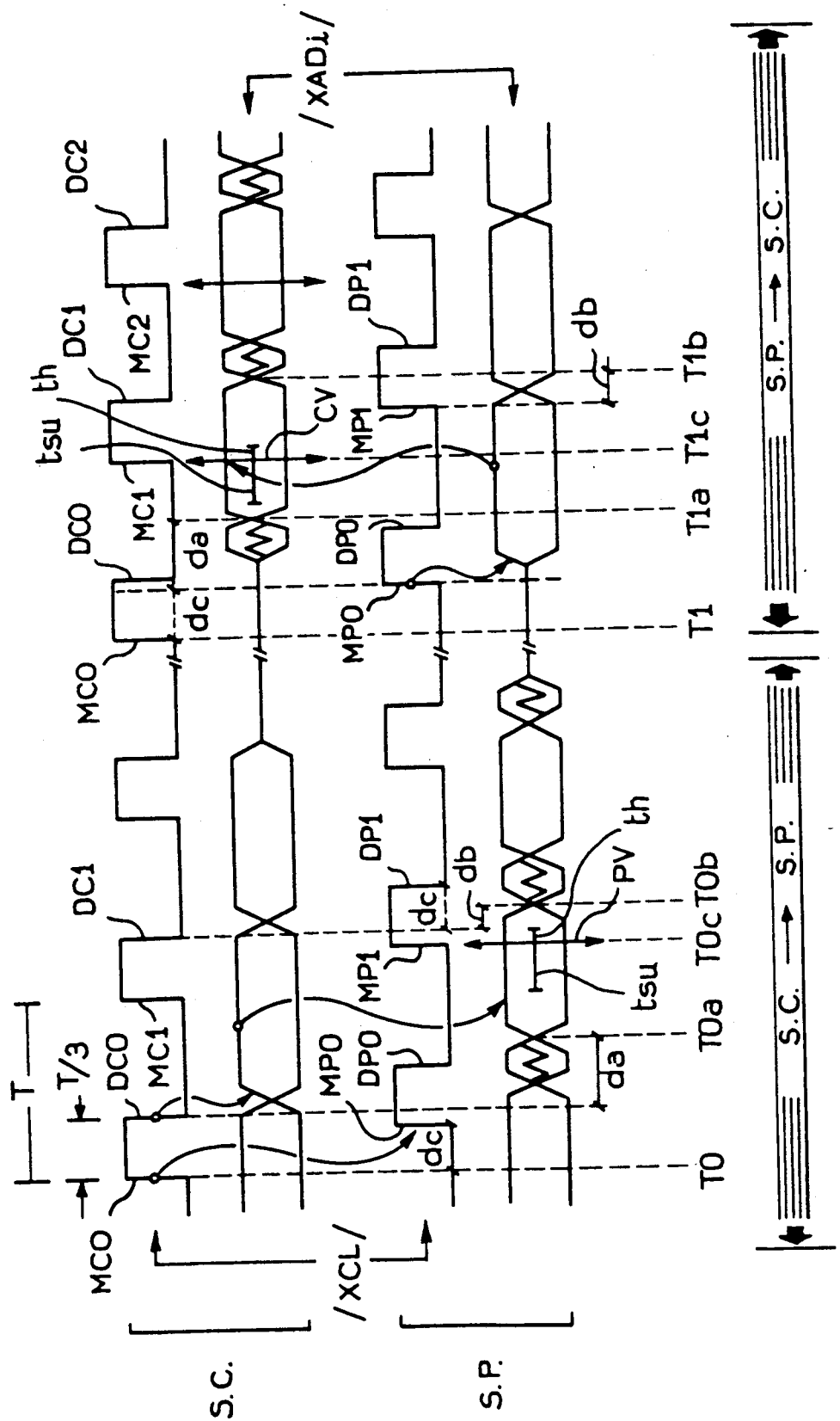

METHOD FOR TRANSMITTING INFORMATION OVER A BIDIRECTIONAL LINK, AND APPARATUS FOR PERFORMING THE METHOD

FIELD OF THE INVENTION

The present invention relates to a method for transmitting information in the form of electrical signals over a bidirectional link that is used particularly for exchanging data between the central units and the peripheral units of a data processing system. In such systems, one or more peripheral stations are connected to a central station by one or more bidirectional transmission buses.

BACKGROUND OF THE INVENTION

In general, for a received data signal to be validated by the active edge of a clock signal, it must be present not only for a minimum time (the "setup time" or tsu) before the arrival of this active edge, but also for another minimum time (the "hold time" or th) after the arrival of this same active edge. The term "active edge" means a transition between two electrical voltages, from a HIGH state to a LOW state (trailing or falling edge), or vice versa (leading edge). The times tsu and th depend on the technology used to manufacture the electronic components, and on the specific circuits used in the stations at the time the data is received. These times are on the order of 10 to 15 ns in length for tsu and 0 to 5 ns for th, in the case of a multivibrator and tristate gate subsystem using what is known as fast technology.

Moreover, a synchronous transmission that uses a synchronizing clock emitted by the central station is embodied in either a monophase mode (that is, the circuits of the transmitter and receiver stations are synchronized at the same leading—or trailing or falling— edge of the clock signal), or a biphase mode (the transmitter and receiver station circuits are synchronized at different leading and trailing or falling edges of the clock signal).

Such synchronous transmissions present problems in the case of long bidirectional linkage. In fact, regardless of the clock frequency, the longer the link, the greater the phase offset of the clock signal in the peripheral station with respect to the central station, for the same pulse. As a result, in the monophase mode, it becomes rapidly impossible to adhere to the th as the line length increases. This is still more difficult given using fast technology shortens the hold time in a given state, HIGH or LOW, of the signals from the transmitter. In practical terms, this technical problem limits, the useful length of the bidirectional links to 50 cm—the back plane or "bottom of the barrel" for data processing systems. Conversely, in the case of biphase transmission from the central station, an offset of the emission of the data signal with respect to the clock signal is obtained, which makes it easy to adhere to the th but contrarily presents problems in the transmission from the peripheral station to the central station in terms of the tsu, which being very fast is not adhered to. One imperfect solution currently used comprises reducing the synchronization frequency, to the detriment of the transmission power.

Thus for high-power, relatively long bidirectional links (several meters in length), resynchronization must be done from the local clock of the receiver via a circuit known as a unifier, which not only increases the number of components (because of the use of two clocks and the unifier circuit) but also introduces a time lag. It is customary to assume that the increase in output attained is always at the cost of a delay in the routing of the data (the output is favored to the detriment of the transmission time).

SUMMARY OF THE INVENTION

To overcome these disadvantages, the invention proposes a method of transmitting data in the form of electrical signals over a bidirectional link including a central station and a peripheral station connected to the central station by a bidirectional transmission bus, the central station being provided with a clock furnishing a synchronizing signal to the peripheral station; according to the invention, synchronization is performed in a biphase mode in transmission from the central station, and in a monophase mode in transmission from the peripheral station.

In a first particular case of the method according to the invention, the peripheral station is synchronized for both transmission and reception at the same edge of the clock signal.

In another particular case of the method according to the invention, the central station transmits at the trailing or falling edge of the clock signal and receives at the leading edge of this signal.

The invention also relates to an apparatus for performing the method according to the invention, of the type including a central station and a peripheral station connected to the central station via a bidirectional transmission bus, with the central station being provided with a clock furnishing a synchronizing signal to the peripheral station via a line for transmitting the clock signal; according to the invention, the apparatus further includes means permitting synchronization in a biphase mode in transmission from the central station, and in a monophase mode in transmission from the peripheral station.

In a particular embodiment of the apparatus according to the invention, the apparatus includes at least one elementary circuit provided with transmission and reception multivibrators and disposed in the central station and connected via a bidirectional transmission line to another elementary circuit provided with transmission and reception multivibrators and disposed in the peripheral station, these multivibrators having the same characteristics of triggering from an input H capable of receiving a clock signal generated via said clock, and this apparatus is characterized in that the synchronizing means include a NOT gate disposed between the output of the clock and the input H of one of the two multivibrators comprising the transmission multivibrator of the central station and the reception multivibrator of the peripheral station; the input H of the other of these two multivibrators is driven by the clock output signal, and the inputs H of the reception multivibrator of the central station and transmission multivibrator of the peripheral station are driven by the same signal generated from the clock.

Thus by a judicious choice of transmission in the biphase mode from the central station associated with a transmission in the monophase mode from the peripheral station, it is possible to increase the acceptable limit length of the bidirectional link to several meters, without having to perform resynchronization. Moreover, the apparatus described hereinafter and used according to the invention is simple in structure, with few complementary components, and hence is relatively inexpensive.

An exemplary embodiment of the invention will now be described, referring to the accompanying drawings.

BRIEF DESCRIPTION OF THE DRAWINGS

FIG. 1 is a diagram illustrating the principle of an apparatus performing the invention with a bidirectional link; and FIG. 2 is a timing diagram showing the various signals circulating on the bidirectional link of FIG. 1.

DESCRIPTION OF THE PREFERRED EMBODIMENT

Turning to FIG. 1, the bidirectional link comprises a central station S. C. connected to a peripheral station S. P. via a bidirectional bus 10. This bidirectional bus 10, of length l, is for instance a parallel transmission bus of eight-bit width. Each line of the parallel bus carries a signal /XADi/, i being an integer between 0 and 7. It is understood that depending on the wishes of the customer, the width of the bus may be extended to 16 or 32 bits or even more. The bidirectional link is used for example in a data processing system to carry information in the form of electrical signals, such as data and/or addresses, from a central subsystem to a peripheral subsystem. The various subsystems are neither shown nor described here, except for their transmission systems S. C. and S. P. Separately from the bus 10, a monodirectional line 12 for transmitting the clock signal is also provided between the two stations and can furnish the station S. P. with a clock signal /XCL/ generated by a transmission synchronization clock 14 that belongs to the station S. C.

Generally, the various electronic components to be described below are made by what is known as fast technology, which enables very steep signal edges, on the order of a few nanoseconds. These components, known in the electronics industry, are identified in the ensuing description by their usual code (such as F04 or 29F52).

Besides the clock 14, the central station S. C. includes a separator amplifier 16 of the F245 type operating in transmission connected between the clock 14 and the clock line 12, and a 29F52 circuit comprising eight elementary circuits 18 (one circuit per bit to be transmitted). Each of the elementary circuits 18 includes memorization multivibrators 20, 26 connected two by two in parallel so that one operates in transmission (multivibrator 20) and the other in reception (multivibrator 26). In FIG. 1, where only one elementary circuit 18 is shown, the type D transmission multivibrator 20 can be seen, with its data input E1 connected to one of the lines B. P. of an internal bidirectional bus of the central subsystem, and its data output S1 connected across a tristate gate 22 to the junction 24 located at the end toward S. C. of the line i of the bus 10. Also in the S. C., the reception monovibrator 26, also type D, is connected in parallel with the multivibrator, with its input E0 connected to the junction 24, and its output S0 connected across a tristate gate 28 to the line B. C. In an essential characteristic of the invention, the clock input H0 of the reception multivibrator 26 is connected directly to the output of the clock 14 via the line 29, while the clock input H1 of the transmission multivibrator 20 is connected to the output of the clock 14 across an F04 NOT gate.

In the peripheral station, the circuits used are quite similar, and even identical in certain cases. A 29F52 circuit is used, only one elementary circuit 32 of which is shown in the drawing. The reception multivibrator 32, type D, has its data input E2 connected to the junction 36 located at the end of the line i of the bus 10 toward S. P., and its data output S2 is connected across a tristate gate 38 to a line B. P. of an internal bidirectional bus of the peripheral subsystem. Similarly, the type D transmission multivibrator 40 has its input E3 connected to the bus B. P. and its output S3 connected to the junction 36 across a tristate gate 42. The clock inputs H2 and H3 of the multivibrators 34 and 40 are connected directly via a line 44 to the output of an F245 separator amplifier 46, the input of which is connected to the clock line 12 in order to receive the signal /XCL/ of the clock 14.

Since the multivibrators 20, 26, 34 and 40 are validated by the leading edges at their clock input H (specifically, H1, H0, H2 and H3), the circuit that has just been described has the effect that the reception multivibrator 26 of the central station and the two multivibrators 34 and 40 of the peripheral station are synchronized at the leading edge of the clock signal /XCL/, while the transmission multivibrator 20 of the central station is synchronized at the trailing edge of this same signal, in fact at the leading edge of the signal that is complementary to /XCL/ and is furnished at the output of the NOT gate 30. Thus a biphase mode function is attained in transmission from the central station, and a monophase mode of function is attained in transmission from the peripheral station.

The clock signal, /XCL/ has two essential parameters: its frequency and its duty cycle (that is, the ratio between the pulse duration and the total period T of the signal). The selection of these parameters depends on the technology used and on the structural characteristics of the circuits, in the present case on the length l of the bidirectional link defined between the two junctions 24 and 36 of the bus 10. The duty cycle of the clock signal is selected in the form 1/N, where N is an integer; preferably the ratio is ⅓ with fast technology.

By way of example, the apparatus described here accepts a maximum frequency of 25 MHz (T=38 ns) for a link length l of 50 cm, and a maximum frequency of 20 MHz (T=48 ns) for a link length l of 1.5 meters, in both cases with fast technology and a cycle ratio of ⅓.

The function of the apparatus that has just been described is a follows:

Assuming data transmission from the central station to the peripheral station, the line 10 is then conditioned in this transmission direction by the emission of control signals to the validation inputs of the tristate gates 28 and 42. The outputs of these gates are said to be disconnected, in that these gates are put in the state of high impedance. Contrarily, the gates 22 and 28 are kept in the state of low impedance, allowing them to furnish the input signal at their output. After the formation of a data signal issuing from the bus B. C. at the input E1 of the transmission multivibrator 20, the appearance of the leading edge of the complementary signal to /XCL/ at the input H1 of this multivibrator causes it to change states and causes the data signal /XADi/ to appear at its output S1. The signal /XADi/ then travels over the corresponding line i of the bus 10 to drive the input E2 of the reception multivibrator 34, which in turn is triggered by the leading edge of the clock signal at its input H2. This data signal travels via the tristate gate 38 and appears on the corresponding line of the bus B. P. It should be noted that because of the presence of the NOT gate 30, the transmission is accomplished in synchronous fashion in the biphase mode.

In the case of data transmission from the peripheral station to the central station, the function of the apparatus is similar, with inversion of the states of HIGH/LOW impedance of the tristate gates. Still, the transmission is accomplished synchronously in the monophase mode.

The timing diagram of FIG. 2 is a good illustration of the advantages obtained by the invention. The left-hand portion of FIG. 2 illustrates data transmission in the biphase mode from the central station S. C. to the peripheral station S. P., while the right-hand portion of FIG. 2 illustrates data transmission in the monophase mode from the peripheral station S. P. to the central station S. C. The timing diagram shows the clock signals /XCL/ and data signals /XADi/ at each end S. C. and S. P. of the bidirectional link.

The clock signal /XCL/ of period T has a generally rectangular shape with a duty cycle of ⅓. In the S. C., this signal is present with its leading edges MC0, MC1, ..., MCn and its trailing edges DC0, DC1, ..., DCn. In the S. P., the clock signal appears offset in time by a duration D. C. and is present with its leading edges MP0, MP1, ..., MPn and its trailing or falling edges DP0, DP1, ..., DPn.

The data signals /XADi/ are synchronized by the clock 14, either on the basis of a trailing or falling edge DC of /XCL/ (transmission from S. C. to S. P.) or on the basis of a leading edge MP of XCL/ (transmission from S. P. to S. C.). Nevertheless, in both transmission directions, the cycle has a duration equal to one clock period T. Moreover, in transmission the duration of the validity of the data signal equals one period T (the transmission multivibrators are triggered at each active edge of the clock signal). In reception, the data signal appears, offset by a duration da, and disappears, offset by a duration db.

Now considering the case of transmission from S. C. to S. P., the signal /XADi/ is emitted at the instant corresponding to the trailing edge of the signal /XCL/ in S. C., for example DC0. This signal will appear with an offset da (time T0a) at the input E2 of the reception multivibrator 34 of S. P. and will disappear with an offset db at time T0b. This multivibrator will validate the thus formed signal at time T0c (corresponding to the edge MP1), which corresponds to the arrival at S. P. of the leading edge of the clock signal associated with the cycle following the cycle in the course of which the data signal in question was generated. This instant of validation is indicated in the signal XADi/ by a double vertical arrow PV, found in the left-hand portion of FIG. 2. The arrow PV serves as a reference to the time periods tsu and th, which are illustrated by two horizontal half-segments. A study of FIG. 2 shows that with respect to the time T0 (corresponding to the edge MC0), the following equations apply: $T0a = T/3 + da$, $T0c = T + dc$, $T0b = T + T/3 + db$. Adhering to the time periods tsu and th imposes the following conditions:

(1) $T0c > T0a + tsu$, hence $2T/3 > tsu + (da - dc)$
(2) $T0b > T0c + th$, hence $T/3 > th + (dc - db)$ The two conditions are easily adhered to by the suitable choice of clock signal characteristics and component characteristics, and are not dependent on the length of the bidirectional link. It can easily be seen that a monophase mode transmission from S. C. would have difficulty in meeting the condition in terms of the th, because the validation arrow PV would be offset in time by T/3 at the height of the edge DP1. In that case, the following condition would have to be met: $db > th + dc$.

Turning now to the case of transmission from S. P. to S. C. (right-hand portion of FIG. 2), the signal /XADi/ is emitted by the edge MP0 with an offset dc with respect to the initial instant T1 representing the corresponding edge MC0 of the clock signal /XCL/ in S. C. This same signal will be received in S. C. at time T1a with a total delay of $dc + da$ with respect to T1, before being validated at time T1c (corresponding to the edge MC1), which is indicated on the signal /XADi/ by a double vertical arrow CV shown with the two horizontal half-segments tsu and th. This signal would disappear in S. C. at time T1b. Once again, a study of FIG. 2 shows that with respect to the initial time T1, the following equations apply: $T1a = dc + da$, $T1c = T$, $T1b = T + dc + db$. Adhering to the times tsu and th imposes the following conditions:

(3) $T1c > T1a + tsu$, hence $T > tsu + (dc + da)$
(4) $T1b > T1c + th$, hence $dc + db > th$ Although condition (4) is easily met by the suitable choice, with respect to the circuit components, of durations $dc + db$ associated with the minimum length of the bidirectional link, condition (3) imposes a limitation to $dc + da$, which is then associated with the length l of the bidirectional link.

It can still be seen, however, that if the transmission from S. P. to S. C. was synchronized in the biphase mode, then the signal /XADi/ would have been offset in time by a duration T/3, which would have also shortened the preformation period of the signal /XADi/ before the arrival of the edge MC1. The result would have been a penalty of T/3 in terms of meeting tsu. It would in fact have been necessary to meet the following condition: $2T/3 > tsu + dc + da$.

Of the four conditions (1) through (4), only condition (3) associates the power of the link with its length. With the fastest technologies, the lower limit of T is set at twice the transmission time in the link lines.

Hence the transmission method according to the invention, and the apparatus for performing it, make a substantial increase in the power of the bidirectional links possible, with a reduced number of supplementary components, yet without necessitating resynchronization from the local clock of the receiver station.

The method according to the invention is adaptable to various types of serial or parallel synchronous transmission, particularly in the message mode, without any particular difficulty.

What is claimed is:

1. A method of transmitting data in the form of electrical signals, over a bidirectional link including a central station (S. C.) and a peripheral station (S. P.) connected to th central station by a bidirectional transmission bus (10), said central station (S. C.) being provided with a clock (14) furnishing a synchronizing clock signal having a leading edge and a falling edge to said peripheral station (S. P.), the method being characterized in that the central station (S. C.) transmits at one edge of the clock signal and receives at the other edge of the clock signal and in that the peripheral station (S. P.) transmits and receives at said other edge of the clock signal such that the synchronization is preformed in a biphase mode upon transmission from the central station (S. C.) and in a monophase mode upon transmission from the peripheral station (S. P.).

2. A method as defined by claim 1, characterized in that the duty cycle of the clock signal is 1/N, preferably ⅓ with fast technology.

3. A method as defined by claim 1, characterized in that the central station (S. C.) transmits at the falling edge of the clock signal and receives at the leading edge of this signal.

4. A method as defined by claim 3, characterized in that the duty cycle of the clock signal is 1/N, preferably ⅓ with fast technology.

5. A method as defined by claim 1, characterized in that the duty cycle of the clock signal is 1/N, preferably ⅓ with fast technology.

6. An apparatus for transmitting data over a bidirectional link of the type including a central station, a peripheral station (S. P.) connected to the central station, a peripheral station (S. P.) connected to the central station via a bidirectional transmission line clock means at said central station (S. C.) for furnishing a synchronizing clock signal having a leading edge and a falling edge to said peripheral station (S. P.) via said transmission line (12), said apparatus being characterized in that the central station includes synchronizing means for synchronizing transmission at one edge of the clock signal and for synchronizing reception at the other edge of the clock signal and said peripheral station includes means for synchronizing transmission and reception at said other edge of the clock signal whereby synchronization is effected in a biphase mode in transmission from the central station (S. C.) and in a monophase mode in transmission from the peripheral station (S. P.).

7. Apparatus as defined by claim 6, characterized in that said synchronizing means at the central station (S. C.) transmits at the falling edge of the clock signal and receives at the leading edge of this signal.

8. An apparatus as defined by claim 7, characterized in that the duty cycle of the clock signal is 1/N, preferably ⅓ with fast technology.

9. An apparatus as defined by claim 6 including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

10. An apparatus for transmitting data over a bidirectional link of the type including a central station, a peripheral station (S. P.) connected to the central station via a bidirectional transmission line (12), clock means at said central station (S. C.) for furnishing a synchronizing clock signal to said peripheral station (S. P.) via said transmission line (12), said apparatus being characterized in that it further includes synchronizing means permitting synchronization in a biphase mode in transmission from the central station (S. C.) and in a monophase mode in transmission from the peripheral station (S. P.), at least one elementary circuit (18) including first transmission and first reception multivibrators (20, 26) disposed at the central station (S. C.) and connected via said bidirectional transmission line to another elementary circuit (32) including second transmission and second reception multivibrators (40, 34) disposed at the peripheral station (S. P.), said first and said second multivibrators each having a clock input H and having the same characteristics of triggering from the input H connected to receive a clock signal generated by said clock means (14), said synchronizing means including a NOT gate (30) disposed between the output of the clock means (14) and the input H of one of two multivibrators (20) among the group comprising the first transmission multivibrator (20, H1) at the central station (S. C.) and the second reception multivibrator (34, H2) at the peripheral station (S. P.), the input H of the other one of said two multivibrators (20, 34) of said group being driven by the clock signal, the inputs H of the first reception multivibrator (26, H0) at the central station (S. C.) and the second transmission multivibrator (40, H3) at the peripheral station (S. P.) being driven by the same clock signal generated by the clock means (14).

11. An apparatus as defined by claim 10, characterized in that the NOT gate (30) is disposed at the input H1 of the first transmission multivibrator (20) of the central station.

12. An apparatus as defined by claim 10, characterized in that the two inputs H of the first reception multivibrator (26, H0) at the central station (S. C.) and of the second transmission multivibrator (40, H3) at the peripheral station (S. P.) are connected to receive the clock signal so as to be driven by said clock signal of the clock means (14).

13. An apparatus as defined by claim 10 including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

14. An apparatus as defined by claim 10, characterized in that said first and said second multivibrators (20, 26, 34, 40) are of the D type with triggering via the leading edge of a signal at their clock input H (H1, H0, H2, H3).

15. An apparatus as defined by claim 11, characterized int that said first and said second multivibrators (20, 26, 34, 40) are of the D type with triggering via the leading edge of a signal at their clock input H (H1, H0, H2, H3).

16. An apparatus as defined by claim 12, characterized int hat said first and said second multivibrators (20, 26, 34, 40) are of the D type with triggering via the leading edge of a signal at their clock input H (H1, H0, H2, H3).

17. An apparatus as defined by claim 10, characterized in that the outputs (S1, S0, S2, S3) of said first and said second multivibrators (20, 26, 34, 40) are monitored by tristate gates (22, 28, 38, 42) which in turn are controlled by the leading edges of signals synchronized from the clock (14).

18. An apparatus as defined by claim 11, characterized in that the outputs (S1, S0, S2, S3) of said first and said second multivibrators (20, 26, 34, 40) are monitored by tristate gates (22, 28, 38, 42) which in turn are controlled by the leading edges of signals synchronized from the clock (14).

19. An apparatus as defined by claim 12, characterized in that the outputs (S1, S0, S2, S3 of said first and said second multivibrators (20, 26, 34, 40) are monitored by tristate gates (22, 28, 38, 42) which in turn are controlled by the leading edges of signals synchronized from the clock (14).

20. An apparatus as defined by claim 19, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

21. An apparatus as defined by claim 14, characterized in that the outputs (S1, S0, S2, S3) of said first and said second multivibrators (20, 26, 34, 40) are monitored by tristate gates (22, 28, 38, 42) which in turn are controlled by the leading edges of signals synchronized from the clock (14).

22. An apparatus as defined by claim 15, characterized in that the outputs (S1, S0, S2, S3) of said first and said second multivibrators (20, 26, 34, 40) are monitored by tristate gates (22, 28, 38, 42) which in turn are controlled by the leading edges of signals synchronized from the clock (14).

23. An apparatus as defined by claim 16, characterized in that the outputs (S1, S0, S2, S3) of said first and said second multivibrators (20, 26, 34, 40) are monitored by tristate gates (22, 28, 38, 42) which in turn are controlled by the leading edges of signals synchronized from the clock (14).

24. An apparatus as defined by claim 11, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

25. An apparatus as defined by claim 12, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

26. An apparatus as defined by claim 14, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

27. An apparatus as defined by claim 15, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

28. An apparatus as defined by claim 16, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

29. An apparatus as defined by claim 17, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

30. An apparatus as defined by claim 18, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

31. An apparatus as defined by claim 21, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

32. An apparatus as defined by claim 22, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

33. An apparatus as defined by claim 23, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

34. An apparatus for transmitting data over a bidirectional link of the type including a central station, a peripheral station (S. P.) connected to the central station via a bidirectional transmission line clock means at said central station (S. C.) for furnishing a synchronizing clock signal to said peripheral station (S. P.) via said transmission line (12), said apparatus being characterized in that it further includes first transmission and reception multivibrators at the central station and second transmission and reception multivibrators at the peripheral station, said multivibrators (20, 26, 34, 40) being of the D type having a clock input H (H1, H0, H2, H3) and connected to be triggered by the leading edge of the clock signal applied to the clock input and synchronizing means permitting synchronization in a biphase mode in transmission from the central station (S. C.) and in a monophase mode in transmission from the peripheral station (S. P.).

35. An apparatus as defined by claim 34, characterized in that the outputs (S1, S0, S2, S3) of said first and said second multivibrators (20, 26, 34, 40) are monitored by tristate gates (22, 28, 38, 42) which in turn are controlled by the leading edges of signals synchronized from the clock (14).

36. An apparatus as defined by claim 35, including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

37. An apparatus as defined by claim 34 including means for connecting the transmission line (12) for transmission of the clock signal to first and second separator amplifiers, the first amplifier (16) being used in transmission at the central station (S. C.) and the second amplifier (46) being used in reception at the peripheral station (S. P.).

* * * * *

UNITED STATES PATENT AND TRADEMARK OFFICE
CERTIFICATE OF CORRECTION

PATENT NO. : 5,048,061

DATED : September 10, 1991

INVENTOR(S) : Maurice HUBERT

It is certified that error appears in the above-identified patent and that said Letters Patent is hereby corrected as shown below:

Col. 6,
Claim 1, line 4, change "th" to -- the --.

Col. 8,
Claim 15, line 2, change "int" to -- in --.

Col. 8,
Claim 16, line 2, change "int hat" to -- in that --.

Signed and Sealed this

Twentieth Day of April, 1993

Attest:

MICHAEL K. KIRK

*Attesting Officer*  *Acting Commissioner of Patents and Trademarks*